United States Patent [19]

MacMaster

[11] 4,065,161

[45] Dec. 27, 1977

[54] CONTAINER OR PANEL CLAMP

[75] Inventor: Edward MacMaster, New Milford, N.J.

[73] Assignee: Rexnord Inc., Milwaukee, Wis.

[21] Appl. No.: 615,164

[22] Filed: Sept. 22, 1975

Related U.S. Application Data

[63] Continuation of Ser. No. 476,049, June 3, 1974, abandoned.

[51] Int. Cl.² .............................................. E05C 5/00
[52] U.S. Cl. .................................................. 292/113
[58] Field of Search .................... 292/113, 114, 247; 52/584

[56] References Cited

U.S. PATENT DOCUMENTS

| | | | |
|---|---|---|---|
| 1,517,995 | 12/1924 | Langenau et al. | 292/113 X |
| 1,678,025 | 7/1928 | Toncray | 292/114 |
| 1,863,340 | 6/1932 | Hynes | 292/113 |
| 2,497,982 | 2/1950 | Deyo | 292/113 |
| 2,966,706 | 1/1911 | Christensen | 292/113 X |
| 3,108,833 | 10/1963 | Christensen et al. | 292/113 |
| 3,309,115 | 3/1967 | Langer | 52/584 X |
| 3,830,705 | 8/1974 | Dewegeli | 292/247 X |

Primary Examiner—Richard E. Moore
Attorney, Agent, or Firm—Shenier & O'Connor

[57] ABSTRACT

A clamp for securing a pair of members in assembled relationship in which a drawhook formed of resilient material with a loop intermediate its ends is frictionally supported at one of its ends for pivotal movement around a first axis on an arm supported on one of the members for pivotal movement around a second axis spaced from the first axis in response to operation by a tool from a released position at which the drawhook is retracted against a stop, through an intermediate position at which the drawhook moves with the arm to engage a strike on the other member, to a locked-up position at which the first axis moves to a beyond-dead-center position with respect to the second axis. The arm is provided with positive means for engaging the drawhook to insure that it moves to fully retracted position when the operation is reversed.

4 Claims, 3 Drawing Figures

U.S. Patent        Dec. 27, 1977        4,065,161
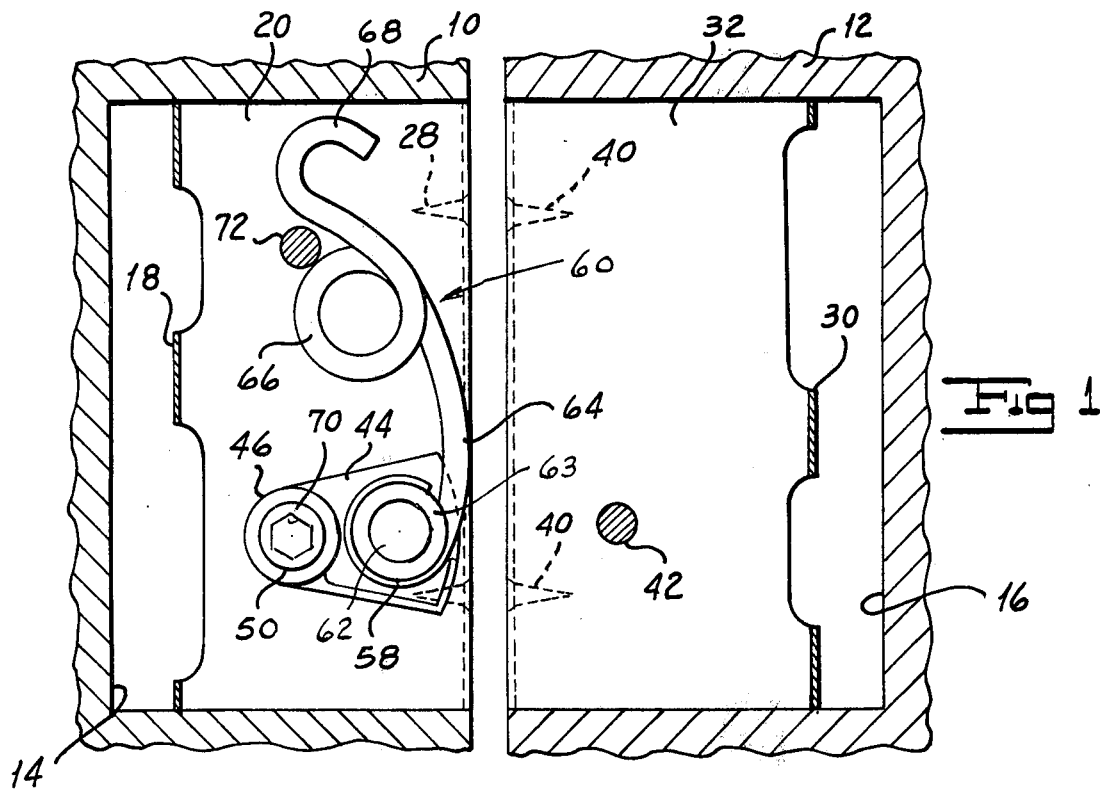
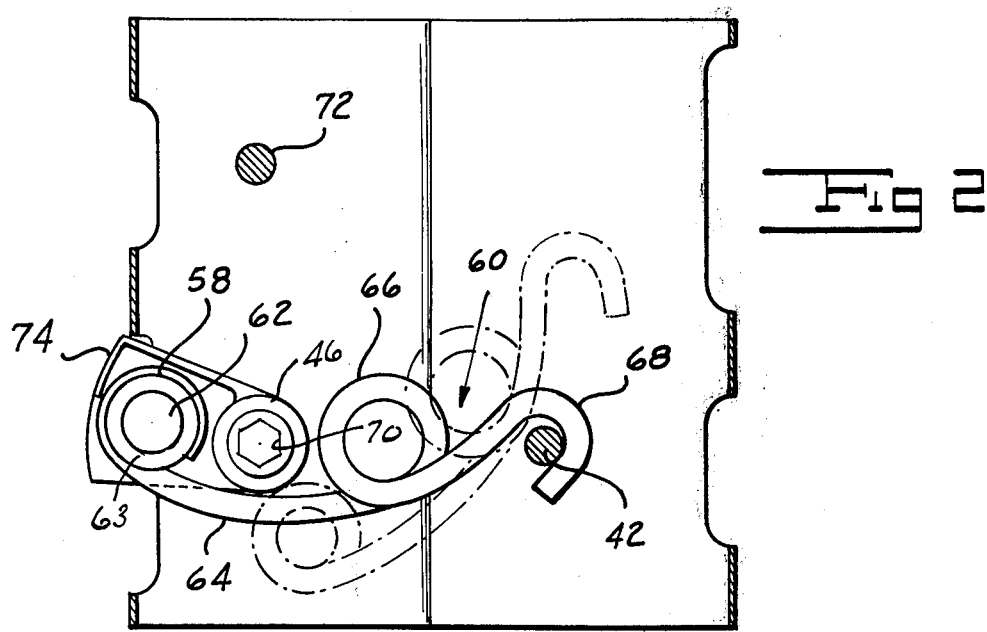
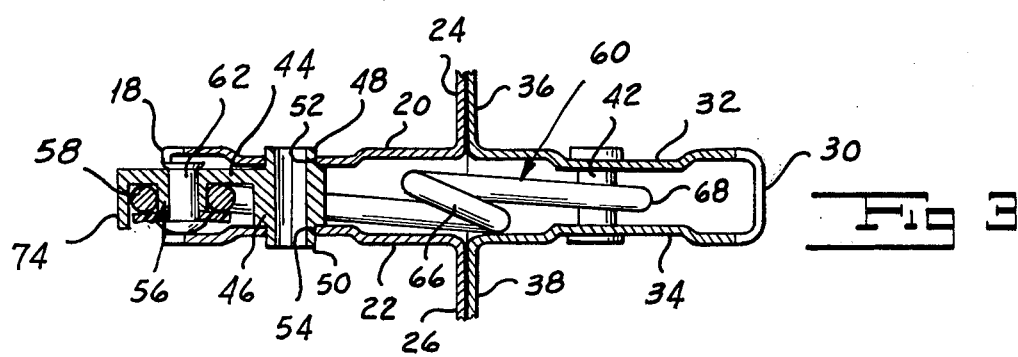

CONTAINER OR PANEL CLAMP

This is a continuation of application Ser. No. 476,049, filed June 3, 1974, now abandoned.

BACKGROUND OF THE INVENTION

There are known in the prior art latches or clamps which are intended to join a pair of members such as panels in abutting relationship along the edges thereof. Many of the latches of this type incorporate drawhooks which are stamped from sheet metal and which are adapted to be swung from a position at which they are retracted to a position at which the drawhook engages a strike in a recess in the other member to be joined. Latches of this type are not as satisfactory as is desirable, since they do not compensate for joint expansion and contraction and the locking thereof is not as secure as is desirable.

Attempts have been made in the prior art to provide fasteners of this type which overcome the defects of fasteners incorporating sheet metal drawhooks. One example of such a fastener is shown in Langer, U.S. Pat. No. 3,309,115. In the arrangement shown in that patent, a drawhook normally housed in a recess of one of the two panels is formed from resilient material to a generally S-shape and is adapted to be swung to a position at which it engages a strike in the other of the two members. The resiliency of the drawhook accommodates somewhat for joint expansion and contraction. The latch, however, involves a number of defects. The arrangement is relatively complicated. It is not as rugged as is desirable. It has a relatively short life in use. The spring characteristic of the drawhook is such that it does not afford any appreciable deflection without becoming permanently set to an undesirable degree.

I have invented a container or panel clamp which overcomes the disadvantages of clamps of the prior art for joining a pair of members such as panels in abutting relationship. My clamp provides a snap-action over-center locking. The drawhook thereof affords relatively great deflection with little permanent set. My clamp is self-compensating for joint expansion and contraction. It is self-contained. It mounts in any direction. It operates from either side by one hand. It is easily installed.

SUMMARY OF THE INVENTION

One object of my invention is to provide a clamp for joining two panels which overcomes the defects of clamps of the prior art intended to accomplish this purpose.

Another object of my invention is to provide a clamp having a drawhook affording appreciably greater deflection for less permanent set than do resilient drawhooks of the prior art.

Another object of my invention is to provide a clamp for panels or the like which is simpler in construction than are clamps of the prior art.

A further object of my invention is to provide a clamp for a panel or the like which has snap-action over-center locking.

Still another object of my invention is to provide a clamp for panels or the like which is more rugged than are clamps of the prior art.

Other and further objects of my invention will appear from the following description.

In general my invention contemplates the provision of a drawhook of resilient material having a loop intermediate its ends, which drawhook is frictionally mounted for pivotal movement around a first axis on an arm, which arm is mounted on one of the two members to be joined for pivotal movement together with the drawhook from a released position at which the drawhook is housed to a second position at which the drawhook engages a strike in the other member and then to a position at which the first axis moves to a beyond-dead-center position with respect to the second axis, in which position the first axis is releasably retained by the resiliency of the drawhook.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a fragmentary sectional view illustrating a pair of panels provided with my clamp and showing the relative positions of the parts before the clamp is operated.

FIG. 2 is a view similar to FIG. 1 showing the clamp in locked-up position.

FIG. 3 is a sectional view of my improved clamp for panels and the like.

DESCRIPTION OF THE PREFERRED EMBODIMENT

Referring now to the drawings, panels 10 and 12, which may be joined by use of my clamp, are provided with respective recesses 14 and 16. A first cage 18 formed with sides 20 and 22 and with flanges 24 and 26 extending outwardly from the righthand edges thereof as viewed in the drawings, is received in the recess 14. Any suitable means such, for example, as screws 28 may be employed to hold the cage 18 in the recess 14. A second cage 30 provided with walls 32 and 34 carries flanges 36 and 38 extending outwardly from the walls 32 and 34 at the left ends thereof as viewed in the drawings. Screws 40, or the like, may be employed to screw the flanges 36 and 38 to the panel 12 to hold the cage 30 in the recess 16. A rivet or the like 42 extending between the sides 32 and 34 of the cage 30 forms the strike adapted to be engaged by the drawhook, to be described, of my clamp.

The clamp of my assembly includes an arm 44 formed with a hub 46 having trunnions 48 and 50 adapted to be received in openings 52 and 54 in the sides 20 and 22 rotatably to mount the arm on the cage 18.

I provide arm 44 at a location spaced from hub 46 with a hub 56 adapted to receive a loop 58 formed on one end of the drawhook, indicated generally by the reference character 60, of my clamp. A rivet 62 passing through the bore of the hub 56 has a relatively large head which holds a nylon washer 63 firmly in engagement with the loop 58 frictionally to mount the drawhook 60 on the hub 56. Thus the drawhook is frictionally held on hub 56 in any position to which it was theretofore positively moved.

The drawhook 60 includes a generally curved portion 64 leading from the loop 58 to a complete loop or turn 66 in the drawhook 60 intermediate its ends. The end of the drawhook 60 remote from the loop 58 is formed with a hook 68 adapted to engage the strike 42 in operation of the assembly. Projections of the portion 64 of the drawhook and the portion leading from loop 66 to hook 68 form a substantially smooth curve so that the underside of the drawhook rides smoothly along the strike.

I form the hub 46 with a hexagonal bore 70 adapted to be engaged by a wrench or the like to operate the clamp. Cage 18 carries a stop 72 adapted to be engaged by the drawhook in the recessed position thereof. A flange 74 along the end of the arm 44 is adapted to engage the drawhook to limit its movement relative to the arm in one direction and to move the drawhook positively to fully retracted position.

In operation of my clamp, in the retracted position illustrated in FIG. 1 the drawhook 60 rests against the stop 72. It is to be noted that when the drawhook is moved to this position, it should be positively moved against the stop 72 to insure full extent of the drawhook when it is operated to engage the strike 42. When it is desired to clamp the two parts together, a wrench or the like is used to rotate the arm 44 in a clockwise direction as viewed in FIG. 1. When that occurs, the arm 44 and the hook 60 move together until the drawhook engages the strike 42. Upon continued movement of the arm, the drawhook slides smoothly along the strike until hook 68 engages pin 42. Upon continued movement of the arm 44, the parts 10 and 12 are drawn together into abutting relationship and ultimately the axis of pin 62 rides to beyond-dead-center position with respect to the axis of the hub 46. Owing to the resiliency of the drawhook 60, the rivet 62 snaps into the beyond-dead-center position releasably to hold the panels 10 and 12 in abutting relationship.

It will be seen that I have accomplished the objects of my invention. I have provided a panel or container clamp which overcomes the defects of panel or container clamps of the prior art. It affords greater deflection for less set than do clamps of the prior art incorporating resilient drawhooks. It provides snap-action, over-center locking. It is simple, rugged, easily operated and relatively inexpensive.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A fastener assembly for securing a first member in assembled relationship with a second member which carries a strike including in combination, a first member having a pair of side walls formed with respective trunnion-receiving openings; an arm, a first hub on said arm, and trunnions on the ends of said hub received in said trunnion-receiving openings for mounting said arm on said first member for pivotal movement around a first axis between a first position and a second position, a drawhook of resilient material, said drawhook being formed with a complete loop intermediate the ends thereof, a hook at one end of said drawhook for engaging said strike, a second hub on said arm at a location spaced from said first hub, and a loop adjacent to the other end of said drawhook received by said second hub for mounting said drawhook on said arm for movement around a second axis spaced from said first axis and for movement between a retracted position corresponding to the first position of said arm and a latching position of said drawhook corresponding to the second position of said arm and in which latching position said second axis occupies a beyond-dead-center position with respect to said first axis, the arrangement being such that a plane perpendicular to said first and second axes extends through a portion of said drawhook mounting means and said loop adjacent to said arm mounting means in the latching position of said drawhook and flange acting interengageable flange on said arm abutting said drawhook in intermediate positions of said arm and said drawhook for moving said drawhook fully to its retracted position as said arm moves from its second position to its first position.

2. A fastener assembly as in claim 1 in which said drawhook mounting means comprises means for frictionally retaining said drawhook in a position around said second axis to which it has been moved.

3. A fastener assembly as in claim 2 including a positive stop engaged by said drawhook in the retracted position thereof.

4. A fastener assembly as in claim 3 in which said interengageable means comprises a flange on said arm.

* * * * *

UNITED STATES PATENT AND TRADEMARK OFFICE
CERTIFICATE OF CORRECTION

PATENT NO. : 4,065,161
DATED : December 27, 1977
INVENTOR(S) : Edward MacMaster

It is certified that error appears in the above-identified patent and that said Letters Patent are hereby corrected as shown below:

Column 4, line 30, before "flange" insert -- a --;

lines 30 and 31, delete "acting interengageable flange".

Signed and Sealed this

Eleventh Day of April 1978

[SEAL]

Attest:

RUTH C. MASON
Attesting Officer

LUTRELLE F. PARKER
Acting Commissioner of Patents and Trademarks